D. J. SCHEELE.
WHEEL.
APPLICATION FILED MAY 15, 1909.

995,295.

Patented June 13, 1911.

2 SHEETS—SHEET 1.

Witnesses
Lloyd W. Patch
M. K. Freeman

Inventor
David J. Scheele
By Louis Bagger
his Attorneys

E. SCHINDLER.
CLOSET SEAT.
APPLICATION FILED MAY 14, 1910.
995,296. Patented June 13, 1911.
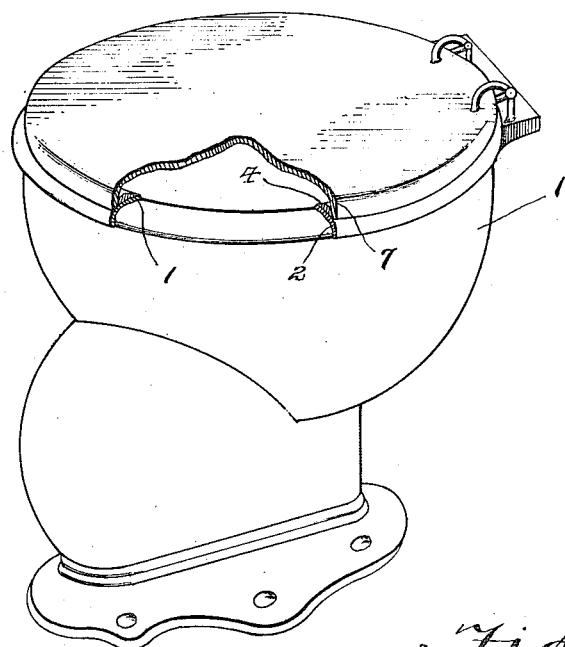
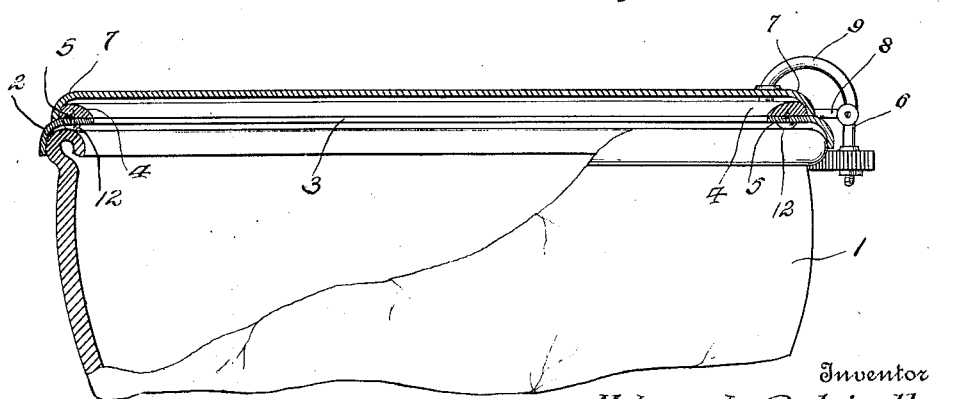
Witnesses
Frederick L. Fox,
E. Edmonston Jr.
Inventor
Edward Schindler
By Victor J. Evans
Attorney

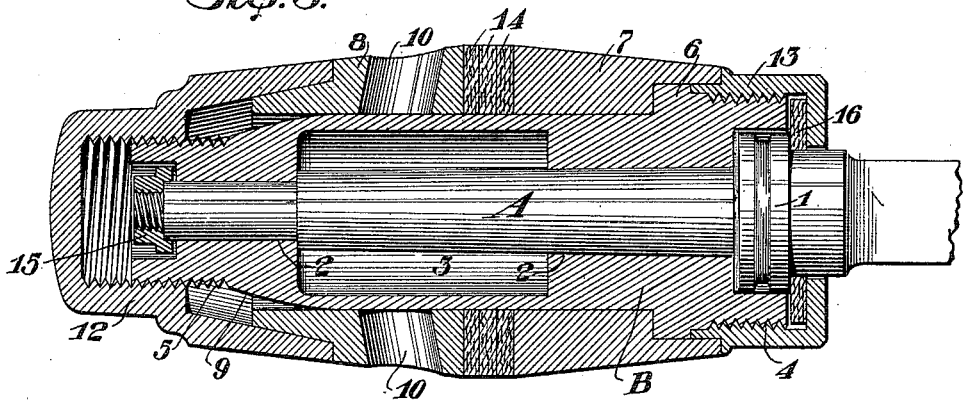
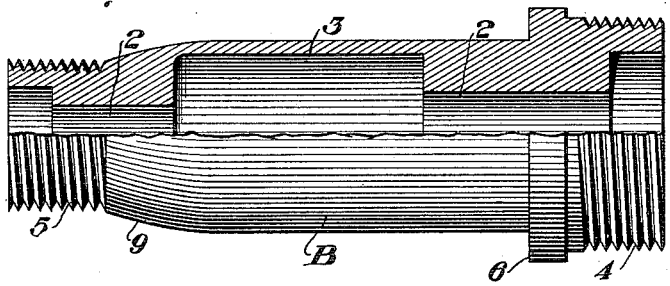
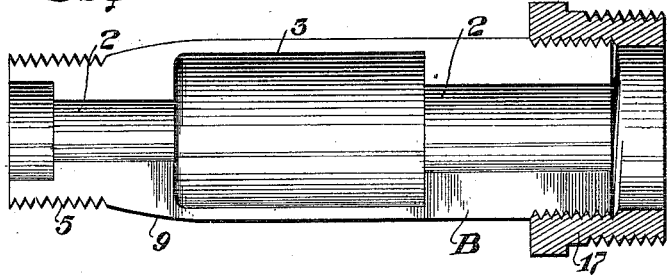

UNITED STATES PATENT OFFICE.

DAVID J. SCHEELE, OF MEMPHIS, TENNESSEE.

WHEEL.

995,295. Specification of Letters Patent. Patented June 13, 1911.

Application filed May 15, 1909. Serial No. 496,167.

*To all whom it may concern:*

Be it known that I, DAVID J. SCHEELE, a citizen of the United States, residing at Memphis, in the county of Shelby and State of Tennessee, have invented certain new and useful Improvements in Wheels, of which the following is a specification.

My invention relates to an improvement in wheels, and one object is to provide a wheel which may be put together entirely without bolts or screws, and one in which the spokes will be of uniform size throughout their length, so that they are not weakened by being reduced, at different points.
Another object is to provide means for tightening the spokes between the rim and hub, and still another object is to provide a wheel which may be easily repaired without the necessity of taking it to the carriage-maker or blacksmith.

With these several objects in view, my present invention consists in certain novel features of construction and combinations of parts which will be hereinafter described and pointed out in the claims.

Figure 1:
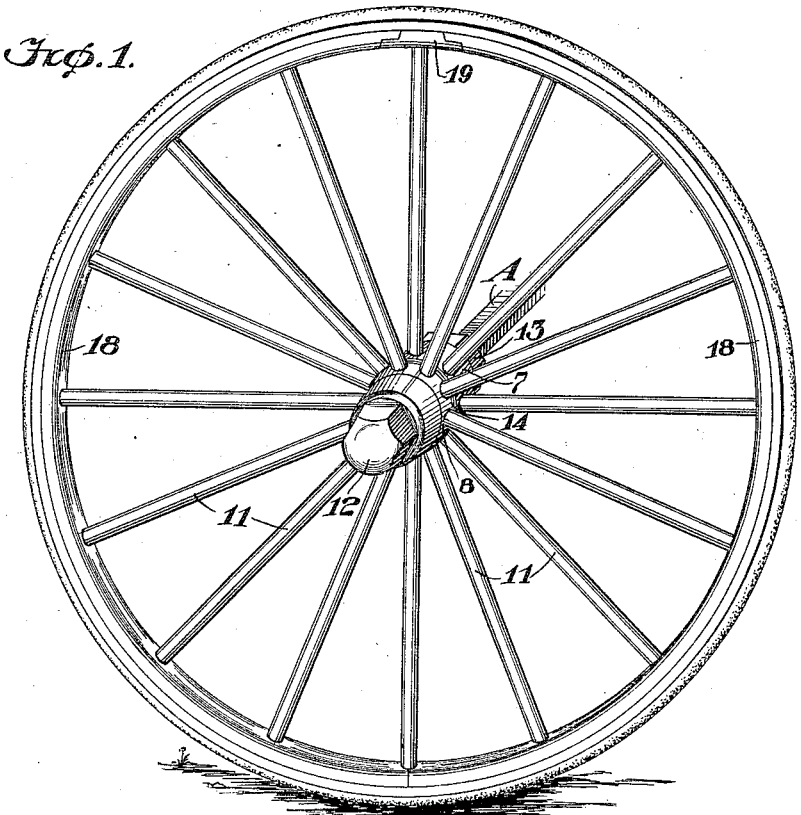
Figure 2:
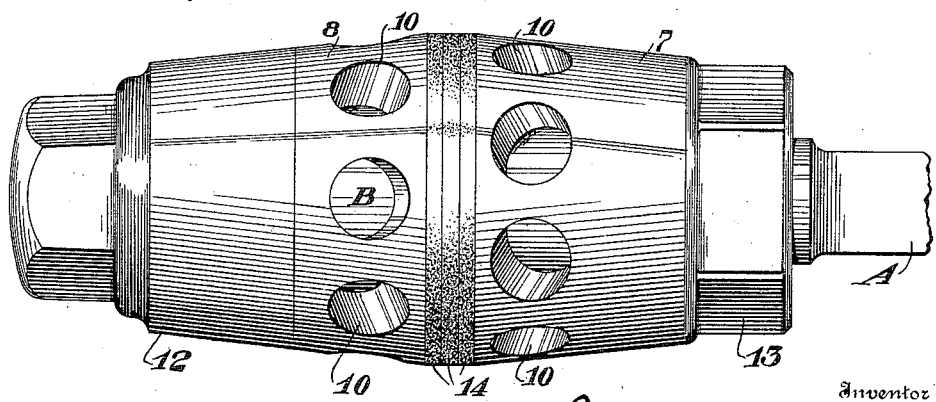

In the accompanying drawings:—Figure 1 is a view in perspective of the wheel, Fig. 2 is an enlarged view in side elevation of my improved hub, Fig. 3 is a section through the latter showing the end of the axle in elevation, Fig. 4 is a partial section and part elevation of the hub box, Fig. 5 is a view of a slightly modified form of hub box.

The axle A, is for the most part of standard construction, although it preferably has a circumferentially grooved collar 1, to assist in preventing the escape of oil or grease, and to also prevent the ingress of dust and dirt.
B, indicates the hub box. This may be made in various forms, of which I have shown two in Figs. 4 and 5, the former showing it in one piece, and the latter in halves or sections. This box is counterbored to fit and turn upon the axle at the bearings 2, 2, and between these bearings it is chambered out as at 3 to receive a large supply of lubricant, as in this way I provide a wheel which will run an almost indefinite period—a year at least—without re-oiling. The form of hub box shown in Fig. 4 is externally screw-threaded at each end as at 4 and 5, and at the larger end is provided with a collar 6. The outer end of the hub box is tapered or rounded as at 9, to give it a cam surface, the purpose of which will be explained later.

The exterior of the hub is composed of the two sleeves 7 and 8, the sleeve 7 fitting and abutting snugly against the collar 6, and both sleeves being provided with mortises 10, 10, adapted to receive the inner ends of the spokes 11, 11, of the wheel; and the two sleeves are held in place by the outer cap 12, which screws on to the threads 5 of the end of the box B. Interposed between the two sleeves are several washers 14, 14. I have shown three, which may be made of metal, leather, or rubber, preferably the former as in this way when it is desired to bring the sleeves closer together to tighten the spokes into the rim, one or more of the washers which are comparatively thin may be removed when of metal, or if of leather or rubber, they may be compressed to the required thickness by screwing up the dust guard cap 12.

If desired, an ordinary nut 15 may be screwed on the outer end of the axle to doubly insure the retention of the wheel upon the axle, although this is not at all necessary as the cap 13 would absolutely preclude the possibility of the wheel coming off the axle, as the collar 1 would prevent it.

Interposed between the cap 13 and the collar 1 is a leather washer 16 which prevents the egress of oil and grease, and the ingress of dirt or grit.

As previously suggested, the hub box may be made in two sections as shown in Fig. 5, in which event an externally and internally-threaded collar 17 takes the place of the threads 4 and the collar 6, disclosed in the construction illustrated in Fig. 4, and holds the sections together at that end.

The rim is made for the most part of two sections 18, 18, which have the usual orifices to receive the outer ends of the spokes, and the only peculiarity in this respect in my invention over others is that it is my purpose to have one of these orifices at the juncture of the rims, so that the spoke will assist in holding the ends of the rim in place, thus avoiding the necessity of plates and clips and bolts or screws. This is illustrated in Fig. 1. A filling section 19 is adapted to fill the space created by the extension of the rim in tightening the wheel. This is likewise held by one of the spokes, and it might also be held by a bolt or screw, but this is unnecessary.

Now in assembling the parts, the cap 13 is placed loosely on the axle before the collar 1 is shrunk thereon. Then the hub box is slid in place, and the cap 13 may be screwed on its inner end with the washer 16 between the two. Then the inner sleeve 7 with its full complement of spokes is put in place; then the washers 14, 14, and then the sleeve 8 with its spokes. As the sleeves are put in place, the spokes which may extend into the bore of the sleeves are forced outwardly by riding up upon the taper or incline 9, at the outer end of the hub box, and in this way as the sleeves are forced home, the spokes are forced outwardly or inwardly, thus tightening the rim as much as it will stand.

To remove the wheel, when it is desired to replace a broken spoke, the cap 13 is first loosened; this will admit of the wheel being removed entirely, and then to replace a broken spoke, the cap 12 is removed, and the sleeves slid off, the broken spoke being sawed off close to the hub and its inner end allowed to drop through to the center, after which a new spoke is placed therein, its inner end being extended well into the center of the bore and thence pushed outwardly into the orifice in the rim, and the parts are again forced together, thus forcing the spoke out endwise, and the wheel is as good as new.

The wheel is oiled by filling the chamber 3 as full as it will hold.

In this way, I have provided a wheel which may be easily repaired by any person of ordinary skill and experience, without the use of tools save a wrench, there being no bolts, screws, or anything of that nature, the only parts to be loosened being the caps 12 and 13 at the opposite ends of the hubs.

It is evident that more or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. In a wheel, the combination with a rim and spokes, of a hub containing a box having a tapering or inclined end, sleeves having orifices adapted to receive the inner ends of the spokes, the inclined or tapering portion of the box in position to force the spokes outwardly when the parts are assembled, and a screw cap at the outer end of the hub constructed and adapted to screw upon the end of the box and retain the various parts in their assembled position.

2. In a wheel, the combination with a rim and spokes, of a hub containing a box having a tapering or inclined end, sleeves having orifices adapted to receive the inner ends of the spokes, the inclined or tapering portion of the box in position to force the spokes outwardly when the parts are assembled, a screw cap at the outer end of the hub constructed and adapted to screw upon the end of the box and retain the various parts in their assembled position, and washers interposed between the sleeves.

In testimony whereof I affix my signature, in the presence of two witnesses.

DAVID J. SCHEELE.

Witnesses:
VERNON E. HODGES,
LLOYD W. PATCH.